United States Patent [19]

Kasten

[11] 4,247,435
[45] Jan. 27, 1981

[54] INTUMESCENT FIRE RETARDANT COATING COMPOSITIONS

[75] Inventor: Nelson H. Kasten, Webster Groves, Mo.

[73] Assignee: Monsanto Company, St. Louis, Mo.

[21] Appl. No.: 947,681

[22] Filed: Oct. 2, 1978

[51] Int. Cl.³ .................. C09D 5/16; C09D 5/18; C08L 31/04
[52] U.S. Cl. .................. 260/29.6 MP; 106/18.16; 106/18.18; 252/8.1
[58] Field of Search .................. 417/390 D; 428/921; 106/15 FP, 18.16, 18.18; 252/8.1; 260/30.6 R, 851, 853, 854, 855, 29.6 MP

[56] References Cited

U.S. PATENT DOCUMENTS

| | | | |
|---|---|---|---|
| 3,294,730 | 12/1966 | Jukes | 260/30.6 R |
| 3,513,114 | 5/1970 | Hahn et al. | 260/8 |
| 3,562,197 | 2/1971 | Sears et al. | 260/28.5 |
| 3,801,526 | 4/1974 | Lonning | 260/30.6 R |
| 3,883,463 | 5/1975 | Jin et al. | 260/851 X |
| 3,914,193 | 10/1975 | Fessler | 260/17 R |
| 3,969,291 | 7/1976 | Fukuba et al. | 260/17.3 |
| 3,992,338 | 11/1976 | Noyes | 260/851 X |
| 4,003,864 | 1/1977 | Roth et al. | 260/851 X |
| 4,009,137 | 2/1977 | Dany et al. | 260/29.6 MP |
| 4,043,987 | 8/1977 | Jolicoeur | 260/29.6 X |
| 4,101,485 | 7/1978 | Brooks et al. | 260/851 X |

*Primary Examiner*—Michael R. Lusignan
*Attorney, Agent, or Firm*—H. Croskell

[57] ABSTRACT

Improved aqueous intumescent fire retardant coating compositions comprising:
- (A) a carbonific;
- (B) a film-forming binder; and
- (C) a substantially water-insoluble phosphorus-containing material having at least one P-O-P linkage;

wherein (A), (B) and (C) constitute from about 20 to about 90 percent by weight of the total composition, the improvement wherein said composition further comprises a viscosity stabilizing amount of an organic chelating agent, which agent is different from components (A), (B) or (C).

7 Claims, No Drawings

INTUMESCENT FIRE RETARDANT COATING COMPOSITIONS

BACKGROUND OF THE INVENTION

1. Field of the Invention

This invention relates to intumescent fire retardant coating compositions. Objects coated with such a composition are provided protection in case of a fire because in a fire the materials in the coating decompose and intumesce (bubble and foam) resulting in the formation of a non-flammable barrier which insulates the object from heat.

More particularly, this invention relates to water-based intumescent fire retardant coating compositions which contain a phosphate compound as a fire retardant additive.

2. Description of the Prior Art

It is well known that various phosphorus-containing compounds can be used as fire retardant additives in intumescent coating compositions. Although phosphate compounds which are relatively water-soluble, such as mono-ammonium ortho phosphate, have been used in these compositions, it has recently been discovered that improved durability of the coating is obtained when relatively water-insoluble phosphates are employed. Coatings with improved washability, water-resistance, moisture-resistance and weather-resistance are obtained when relatively water-insoluble phosphates are employed in the intumescent coating compositions.

Ammonium polyphosphates are disclosed as being useful as a fire retardant additive in intumescent coating compositions in U.S. Pat. No. 3,562,197, issued to Paul G. Sears et al on Feb. 9, 1971. These ammonium polyphosphates are described as substantially water-insoluble and are stated to be particularly useful in water-based paint formulations. These water-based compositions are said to generally comprise an aqueous dispersion of a binder and a carbonific, i.e., a carbon-yielding substance, in addition to the phosphate fire retardant material.

Substantially water-insoluble ammonium polyphosphates are also employed in intumescent coating compositions described in U.S. Pat. No. 3,513,114 issued to Frank J. Hahn et al on May 19, 1970. These compositions include a solvent plasticizer in addition to a binder, carbonific and the phosphate material.

In U.S. Pat. No. 4,009,137, issued to Franz-Josef Dany et al on Feb. 22, 1977, high molecular weight ammonium polyphosphates which are said to be very scarcely soluble in water are employed in intumescent flame-retardant coating compositions.

Substituted ammonium polyphosphates are disclosed as being useful as flame retardant additives in water-based coating compositions in U.S. Pat. No. 4,043,987, issued to Carmel R. Jolicoeur et al on Aug. 23, 1977. These polyphosphates are described as compounds based on ammonium polyphosphate having a proportion of its ammonium radicals substituted by an organic nitrogenous spumific agent containing "reactive nitrogen". The term "reactive nitrogen" refers to nitrogen in the form of amino, imino or isocyanate radicals. A spumific material is defined as one which, on heating, decomposes to give gaseous products required for the formation of a froth or foam. These substituted ammonium polyphosphate compounds are described as being substantially water-insoluble.

In U.S. Pat. No. 3,969,291 issued to Kozo Fukuba et al on July 13, 1976 there is described the use of a substantially water-insoluble amide polyphosphate condensate as a fire retardant additive in intumescent coating compositions which also contain a film-forming binder and a carbonific material.

Still another type of phosphate compound useful as a flame retardant in intumescent coating compositions is described in U.S. Pat. No. 3,914,193 issued to Robert G. Phessler et al on Oct. 21, 1975 wherein the use of a low viscosity crystalline form of melamine pyrophosphate is disclosed.

The use of the aforementioned substantially water-insoluble phosphate compounds in intumescent coating compositions results in compositions which have properties far superior to coating compositions containing water soluble ammonium phosphates.

However, an improvement in certain properties is desirable for intumescent coating compositions containing substantially water-insoluble phosphates. For example, viscosity stability problems, i.e., an increase in viscosity of the composition upon storage, have occurred in water-based intumescent coating compositions containing these phosphate compounds and it is desirable to improve the viscosity stability of these compositions.

It is therefore, an object of the present invention to provide aqueous intumescent fire retardant coating compositions which exhibit improved storage stability.

It is a further object of this invention to provide a method of stabilizing the viscosity of aqueous intumescent fire retardant coating compositions which contain certain substantially water-insoluble phosphorus-containing materials.

These and other objects will become apparent from the following detailed description.

SUMMARY OF THE INVENTION

In accordance with this invention, there are provided improved aqueous intumescent fire retardant coating compositions comprising:

(A) a carbonific;
(B) a film-forming binder; and
(C) a substantially water-insoluble phosphorus-containing material having at least one P—O—P linkage;

wherein (A), (B) and (C) constitute from about 20 to about 90 percent by weight of the total composition, the improvement wherein said composition further comprises a viscosity stabilizing amount of an organic chelating agent, which agent is different from components (A), (B) or (C).

It has been discovered that the inclusion of an organic chelating agent in the type of intumescent coating composition described above has a viscosity stabilizing effect on the composition.

DETAILED DESCRIPTION OF THE INVENTION

The present invention employs an organic chelating agent which, when added to an intumescent fire retardant coating composition of the type described above, has surprisingly been discovered to impart viscosity stability to the composition. Chelating agents will be understood by those skilled in the art to be compounds which contain groups capable of forming a ring structure with a metal ion, the metal being attached by coordinate links to two or more nonmetal atoms in the same molecule. A wide variety of chelating agents are known in the art and any organic type may be employed in this invention provided that in the compositions of this invention as hereinbefore described the chelating agent must be different from components (A), (B) and (C). It is to be understood that the term "organic" herein refers to carbon-containing substances and includes organophosphorus compounds.

Chelating agents suitable for use in this invention include aminocarboxylic acids, for example, ethylenediaminetetraacetic acid (hereinafter EDTA), N-(hydroxyethyl)-ethylenediaminetriacetic acid (hereinafter HEDTA), nitrilotriacetic acid (hereinafter NTA) and diethylenetriaminepentaacetic acid (hereinafter DTPA). Aminocarboxylic acid chelating agents are preferred for use in this invention. The specific compounds just mentioned are commercially available and are particularly preferred for use in this invention. EDTA is most preferred. Procedures well-known in the art may be employed to prepare these compounds.

Many aminophosphonic acid compounds are well-known chelating agents and these represent another type which is preferred for use in this invention. Exemplary compounds of this type are aminotri(methylene phosphonic acid), hexamethylenediaminetetra(methylenephosphonic acid), ethylenediaminetetra(methylenephosphonic acid) and diethylenetriaminepenta(methylenephosphonic acid), which are preferred for use in this invention. These four compounds are commercially sold by Monsanto Company under the trademarks DEQUEST® 2000, 2051, 2041 and 2060 phosphonate, respectively. Methods for the preparation of these types of compounds are known in the art, for example, the processes described in U.S. Pat. Nos. 3,288,846; 3,298,956 and 3,567,768.

Alkylidene and alkylene diphosphonic acid compounds are also well-known chelating agents which may be employed. Illustrative compounds include methylenediphosphonic acid, ethylidenediphosphonic acid, isopropylidenediphosphonic acid, 1-hydroxy ethylidenediphosphonic acid, 1-hydroxy propylidenediphosphonic acid, hexamethylenediphosphonic acid and decamethylenediphosphonic acid. These compounds can be prepared by procedures well known in the art, such as those described in U.S. Pat. No. 3,297,578 issued to M. M. Crutchfield et al on Jan. 10, 1967.

Other well-known organic chelating agents which may be employed in this invention are α-hydroxy carboxylic acids such as gluconic acid, citric acid, tartaric acid and saccharic acid. Still other types of chelating agents are ethanolamines and substituted ethanolamines, carboxylic ethers (e.g., tri- and tetra- carboxylic acid ethers such as methyl hydroxy ether tetracarboxylic acid which is described in U.S. Pat. No. 3,970,698) and polymeric polycarboxylic acid compounds (e.g., polyacrylic acids).

Chelating agents useful in this invention may be compounds which, in structure, are a combination of the various types of compounds just mentioned. One skilled in the art will recognize that a wide variety of such organic chelating agents is possible. As an illustration, it is possible for a chelating compound to contain both carboxylic acid and alkylene phosphonic acid groups.

Those skilled in the art will recognize that, in addition to the previously mentioned well-known types of organic chelating agents, there are still other types of organic chelating agents and these may be employed in this invention. For example, macrocyclic polyethers (crown compounds) have recently been discovered to be effective chelating agents. The preparation and properties of macrocyclic polyethers is described by C. J. Pedersen and H. K. Frensdorff in ANGEWANDTE CHEMIE International Edition (English) 11, 16 (1972).

Although the exemplary compounds mentioned above as useful chelating agents for this invention may be acids, it is to be understood that salts and partial salts of these compounds may also be employed. For example, commercially available chelating agents are often available in a salt form, for example, ammonium, potassium or other alkali metal, as well as the acid form. Depending on the particular coating composition being prepared, it may be preferable to use a salt form to minimize the effect on the composition's pH, which in any case may be adjusted by conventional means if necessary. Preferred salts for use in the present invention are potassium, sodium and ammonium, with ammonium being most preferred.

The intumescent fire retardant coating compositions of this invention also comprise a substantially water-insoluble phosphorus-containing material which has at least one P—O—P linkage. It is believed that this phosphorus-containing material decomposes at elevated temperatures resulting in decomposition products which take part in the intumescence mechanism. Preferred phosphorus-containing materials employed in the compositions of this invention are inorganic materials which yield a phosphorus-containing acid upon decomposition at elevated temperatures.

Preferred substantially water-insoluble phosphorus-containing materials are ammonium polyphosphates, substituted ammonium polyphosphates, amide polyphosphate condensates, melamine pyrophosphates, and mixtures of these materials.

The ammonium polyphosphates are particularly preferred in the compositions of this invention. The preparation of these substantially water-insoluble ammonium polyphosphates and their use in intumescent fire retardant coating compositions are described in the aforementioned U.S. Pat. Nos. 3,562,197 and 4,009,137 and in U.S. Pat. No. 3,397,035, issued to C. Y. Shen on Aug. 13, 1968, which are incorporated herein by reference. These compounds have a P—O—P type linkage and have the general formula: $H_{(n-m)+2}(NH_4)_m P_n O_{3n+1}$ wherein n is an integer having an average value greater than 10 and m/n is between about 0.7 and about 1.1 and the maximum value of m is equal to n+2. The average value of n being greater than 10 is evidenced by the paper chromatography method [Karl-Kroupa, Anal. Chem., 28, 1091 (1956)], and the polymeric P—O—P type linkage is evidenced by NMR spectra which indicates substantially no P—N—P type linkages and no ortho, pyro or short chain P—O—P type groups and by infra-red spectra which indicates P—O—P type linkages but does not indicate substantially any P—N type linkages.

These polymeric polyphosphates can be either straight chain structures or branched chain structures. It should be noted that substantially all of the nitrogen in these polyphosphates is present as the ammoniacal nitrogen and there is substantially no nuclear nitrogen present in the polyphosphates. Although theoretically the ammoniacal nitrogen to phosphorus molar ratio for the polyphosphates of the instant invention is about 1, i.e., (m+2)/n with m=n, when the polyphosphates are completely ammoniated, in some cases the molar ratio of ammoniacal nitrogen to phosphorus is less than 1 and it is intended that this invention pertains to those polymeric ammonium polyphosphates having a molar ratio of not less than about 0.7. In addition, when the phosphorus-containing compounds of the instant invention are characterized herein as being substantially water-insoluble, it is intended to mean that the solubility of a slurry of 10 grams of solids/100 cc. of water at 25° C. for 60 minutes is about 5 grams/100 cc. of water or less. Specifically, for purposes of the present invention, an ammonium polyphosphate having a solubility of a specified value refers to the solubility value in grams per 100 cc. of water when 10 grams of said polyphosphate is slurried in 100 cc. of water at 25° C. for 60 minutes.

The degree of polymerization of the substantially water-insoluble ammonium polyphosphates is difficult to determine since known methods for determining such are "so-called" solution methods, that is, they employ solution techniques for polymerization measurements. For example, it is disclosed in U.S. Pat. No. 3,562,197 that as determined by the end group titration method [Van Wazer, Griffith and McCullough, Anal. Chem., 26, 1755 (1954)] after converting the ammonium polyphosphate to the acid form by ion exchange resins [Van Wazer and Holst, J. Am. Chem. Soc., 72, 639 (1950)], the average numerical value of n is from about 20 to about 400 whereas as determined by the method of light scattering or viscosity correlations obtained from light scattering [Strauss and Wineman, J. Am. Chem. Soc., 80, 2366 (1958)]; modified by use of the Zimm plot method [Stacey, "Light-Scattering in Physical Chemistry", Butterworths, London (1956)], the weight average value of n is above about 500 and possibly up to about 30,000. In U.S. Pat. No. 4,009,137 n is said to have an average value of from 400 to 800.

The term "ammoniacal nitrogen" refers to that nitrogen which is present in the form of ammonium ions and is capable of being removed by the hydrogen form of a strong cation exchange resin, e.g., the hydrogen form of a sulfonate polystyrene resin. The term "non-ammoniacal nitrogen" or "nuclear nitrogen" refers to nitrogen incapable of being removed in the manner of true ammonium nitrogen.

The ammonium polyphosphates can be prepared exhibiting many different crystalline forms as evidenced by their X-ray diffraction patterns and, in general, any of such forms can be used (although Forms 1 and 2, infra, are preferred) as well as the non-crystalline or amorphous form. Crystalline forms illustrative of some of the ammonium polyphosphates suitable for use include the following:

| X-RAY DIFFRACTION DATA[a] | | | | | | | |
|---|---|---|---|---|---|---|---|
| Form 1 | | Form 2 | | Form 3 | | Form 4 | |
| Line[b] | d, A. | Line[b] | d, A. | Line[b] | d, A. | Line[b] | d, A. |
| 1 | 6.06 | 1 | 5.70 | 1 | 6.65 | 1 | 5.70 |
| 2 | 5.47 | 2 | 6.06 | 2 | 5.68 | 2 | 5.60 |
| 3 | 3.83 | 3 | 3.08 | 3 | 5.40 | 3 | 3.42 |
| 4 | 3.50 | 4 | 2.93 | 4 | 3.52 | 4 | 7.00 |
| 5 | 3.24 | 5 | 3.37 | 5 | 3.80 | 5 | 6.10 |

[a]CuKα radiation
[b]Five strongest lines in order of decreasing intensity

The preparation of these ammonium polyphosphates is known in the art, for example, the process described in the aforementioned U.S. Pat. No. 3,397,035. In general, a phosphate-containing material, such as monoammonium orthophosphate, diammonium orthophosphate, condensed phosphoric acid, orthophosphoric acid and the like, is thermally condensed with an ammoniating and condensing agent such as urea, ammonium carbonate, biuret, sulfamide, sulfamic acid, ammonium sulfamate, guanyl urea, methyl urea formamide amino urea, 1-3-diamino urea, biurea and the like. In particular, for example, monoammonium orthophosphate and urea can be thermally condensed to prepare substantially water-insoluble ammonium polyphosphates by heat treating a melt formed from substantially equimolar quantities at a temperature of about 250° C. for a period of about 3 hours.

The substituted ammonium polyphosphates which may be employed in the compositions of this invention are those described in the aforementioned U.S. Pat. No. 4,043,987, which is herein incorporated by reference. A method for the preparation of these polyphosphates is contained in that patent. These substituted ammonium polyphosphate compositions have the general formula

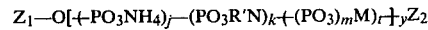

wherein $Z_1$ and $Z_2$ are each selected from $-NH_4$ and $-R'N$, N is a reactive nitrogen, R' is the residue R or a fraction of the residue R of an organic nitrogenous spumific agent of general formula

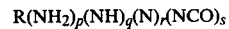

where p, q, r and s are integers from 0 to 6, and (p+q+r+s) is 1 or more; said spumific agent having a nitrogen to carbon ratio of 5:1 to 0.1:1, and a decomposition temperature above 150° C., and wherein j is from 1 to 20, k is 1 to 10, t is 0 to (j+k) and y is 1 or more, and M is a polyvalent metal having a valency of m.

The amide polyphosphate condensates which may be employed in the compositions of this invention are polyphosphates containing nitrogen in the form of an amide and can be prepared, in general, by heat condensing together a phosphoric acid containing material, e.g., ammonium orthophosphate, orthophosphoric acid, polyphosphoric acid, phosphoric anhydride, urea phosphate and a mixture thereof, and a nitrogen source, e.g., a cyanamide derivative such as melamine, dicyanamide or a mixture thereof, in the presence of a condensing agent such as, e.g., urea, urea phosphate or a mixture thereof. It is preferred to use urea phosphate and melamine. Further details for the preparation of these amide polyphosphate condensates are provided in the aforementioned U.S. Pat. No. 3,969,291 which is herein incorporated by reference.

In U.S. Pat. No. 3,914,193 there are provided details for the preparation of the melamine pyrophosphates which may be employed in the compositions of this invention and that patent is herein incorporated by reference.

The water-based intumescent fire retardant compositions of this invention also comprise a film-forming binder. Those skilled in the art will recognize the various polymers that film-forming binders typically comprise. A polymer in a solution, suspension or emulsion with an organic solvent or water is typically the form for the film-forming binder. The polymer-containing material must be capable of forming films and be compatible in the aqueous mixture of the phosphorus-containing material and carbonific to be satisfactory in these compositions. Typical of polymeric materials which may be employed are polyvinyl acetate, polyacrylonitrile, polyvinyl chloride, polyvinylidene chloride, a copolymer of vinyl acetate and an acrylate, a copolymer of vinyl acetate and ethylene, a copolymer of vinyl chloride and an acrylate, a copolymer of vinylidene chloride and acrylonitrile, a copolymer of vinylidene chloride and vinyl chloride, and a copolymer of styrene and an acrylate. Preferred polymers are polyvinyl acetate and a copolymer of vinyl acetate and ethylene.

As is known in the art, it may be desirable to include in the film-forming binder other additives to obtain desirable film-forming properties. For example, it may be desirable to add a plasticizer or a thermosetting resin, such as a methylated melamine resin, to obtain particular film properties. Various solvent plasticizers are disclosed in the aforementioned U.S. Pat. No. 3,513,114.

The compositions of this invention also comprise a carbonific, that is a substance which yields carbon upon thermal decomposition. Any of the well known carbonifics suitable for use in water-based intumescent compositions may be employed. These include urea-formaldehyde resins, melamine-formaldehyde resins, polyhydric compounds, chlorinated paraffin materials, carbohydrates, amine compounds, proteins and mixtures thereof. Exemplary polyhydric compounds are hexatols, pentatols, monopentaerythritols and polypentaerythritols. Dipentaerythritol and tripentaerythritol are preferred carbonifics. Also preferred are amine compounds, for example dicyandiamide, urea, melamine, dimethyl urea and glycine, with dicyandiamide and melamine being most preferred.

The compositions of this invention may also comprise various other additives well known in the art. Such additives include dyes, pigments, swelling agents, wetting agents, dispersing agents, fungicides, bacteriocides, inorganic fibers and the like. In general, these additives are, if used, employed in minor amounts usually less than about 15 percent by weight of the total weight of the composition.

The amounts of the various components in the compositions of this invention may vary widely, depending upon the particular materials employed and the desired properties for the composition, usually related to the intended application. The chelating agent is employed in an amount adequate to stabilize the viscosity of the intumescent coating composition and this amount will vary depending upon the particular composition and particular chelating agent. Stabilizing viscosity herein means reducing the tendency of the viscosity of the composition to increase with time. In general, the chelating agent will be present from about 0.1 percent to about 10 percent by weight of the total composition. A preferred range is from about 0.5 to about 5 percent by weight of the total composition. Using the phosphorus-containing material, i.e. component (A), as a basis, the chelating agent is typically present in the compositions of this invention at from about 0.3 to about 30 percent, and preferably at from about 1 to about 10 percent, by weight of component (A).

It is recognized that diluted mixtures of chelating agents are common and may be employed in this invention. Unless otherwise specified, reference herein to an amount of chelating agent means the amount of active ingredient. "Active ingredient" herein means the compound which is the chelating agent, except when such compound is a salt of an acid the active ingredient is the corresponding acid of the salt.

Typical amounts of the other components in the compositions of this invention are disclosed in the prior art.

In general, the phosphorus-containing component may be present from about 5 to about 90 percent by weight of the total solids in the composition. The film-forming binder is usually a polymer mixture of from about 40 to about 70 percent solids and, in general, is employed in an amount which provides these solids at from about 5 to about 35 percent by weight of the total solids in the composition. The carbonific component is, in general, present from about 3 to about 70 percent by weight of the total solids in the composition. In general, the phosphorus-containing material, film-forming binder and carbonific comprise from about 20 to about 90 percent by weight of the total composition.

In preparing the composition, water and the components to be incorporated into the composition other than the film-forming binder and plasticizer (if used) are mixed and ground together such as in a pebble mill for varying lengths of time depending on the ingredients used and the desired paint properties, such as sheen, smoothness and the like, but usually from about 15 minutes to about 5 hours are sufficient, and then the film-forming binder and plasticizer (if used) are introduced into the composition under agitation and mixed usually for about 15 to about 30 minutes.

The following examples will illustrate the present invention in greater detail, but the present invention is not to be construed as being limited to these examples since various modifications are possible within the scope of this invention. Unless otherwise indicated herein, all parts, percentages, ratios and the like are by weight.

EXAMPLE I

PREPARATION OF INTUMESCENT COATING COMPOSITIONS

Intumescent coating compositions were prepared as follows:

| Ingredients | Parts Composition A | Parts Composition B |
| --- | --- | --- |
| Initial Charge | | |
| Water | 100 | 100 |
| Potassium Tripolyphosphate | 1.10 | 1.18 |
| SURFACTOL ® 365[1] | 1.49 | 1.60 |
| Ammonium Polyphosphate[2] | 95.54 | 102.61 |
| Melamine | 29.40 | 31.58 |
| Dipentaerythritol | 27.58 | 29.62 |
| COSAN ® 635W[3] | 0.35 | 0.37 |
| Second Charge | | |
| Titanium Dioxide | 22.06 | 23.69 |
| CHLOROWAX ® 70[4] | 14.70 | 15.79 |
| Third Charge | | |
| NATROSOL ® 250 HR[5] (2.5% Solution) | 9.94 | 10.67 |
| UCAR ® LATEX 5000[6] | 80.88 | 86.87 |
| COLLOID ® 677[7] | 1.45 | 1.56 |
| TOTAL | 384.49 | 405.54 |

[1] A nonionic surfactant obtained by reacting castor oil with ethylene oxide and sold by The Baker Castor Oil Company
[2] PHOS-CHEK ® P/30 Fire Retardant sold by Monsanto Company
[3] A complexed alkyl amine antibacterial agent sold by Cosan Chemical Corporation.
[4] A resinous chlorinated paraffin sold by Diamond Alkali Company.
[5] A hydroxy ethyl cellulose material sold by Hercules Powder Company.
[6] A vinyl acetate copolymer latex binder sold by Union Carbide Corporation.
[7] A defoamer sold by Colloids, Incorporated.

The initial charge was placed in a container and mixed on a paint shaker for 5 minutes. The materials in the second charge were then added to the container and the ingredients were mixed on the shaker for 15 minutes. The materials in the third charge were then added to the mixture slowly while stirring and the container was placed on the shaker for 15 minutes.

phorus solubilization was determined by standard wet chemical methods.

TABLE II

| | SAMPLE | | | | | | | | | | |
|---|---|---|---|---|---|---|---|---|---|---|---|
| | GROUP A | | | | | | GROUP B | | | | |
| | 1 | 2 | 3 | 4 | 5 | 6 | 7 | 8 | 9 | 10 | 11 |
| Viscosity, Krebs Units | | | | | | | | | | | |
| Initial | 69 | 76.5 | 74 | 79 | 75.5 | 74 | 61.5 | 70.5 | 69 | 80.5 | 76 |
| 1 Week | 90 | 76 | 83 | 76 | 79.5 | 86 | 74.5 | 71.5 | 71 | 81.5 | 77.5 |
| 4 Weeks | 91.5 | 78.5 | 82 | 76 | 75 | 80 | 82 | 70.5 | 70 | 87 | 82 |
| % Increase In 4 Weeks | 33% | 3% | 11% | −4% | −1% | 8% | 33% | 0 | 1% | 8% | 8% |
| Water Soluble Phosphorus (%) | | | | | | | | | | | |
| Initial | 1.32 | 1.21 | 1.22 | 1.15 | 1.20 | 1.24 | 1.09 | 1.02 | 1.04 | 1.34 | 1.26 |
| 1 Week | 1.81 | 1.67 | 1.77 | 1.43 | 1.54 | 1.56 | 1.53 | 1.13 | 1.16 | 1.41 | 1.35 |
| 4 Weeks | 2.55 | 2.48 | 2.50 | 2.12 | 2.18 | 2.00 | 2.70 | 1.45 | 1.67 | 1.78 | 1.88 |
| % Increase In 4 Weeks | 93% | 105% | 105% | 84% | 82% | 61% | 148% | 42% | 61% | 33% | 49% |

The compositions thus prepared were typical intumescent coating compositions except for slightly reduced water contents to allow for incorporation of additives in Example II without altering the percentages of the other basic ingredients.

EXAMPLE II

The following samples were prepared by adding certain amounts of chelating agents within the scope of this invention to portions of the composition prepared in Example I. Samples in Group A employed Composition A of Example I and samples in Group B employed Composition B.

EXAMPLE III

By a procedure similar to that described in Example II, samples of a commercial intumescent fire retardant latex paint plus a chelating agent were prepared and tested for viscosity stability and water soluble phosphorus. A commercial paint of the type employed would typically contain 25–50 percent water, 20–30 percent phosphorus-containing fire retardants, 10–15 percent polymeric binder, 8–15 percent carbonifics, 3–8 percent pigments and minor amounts of other additives. The paint employed was determined by analysis to contain 23.8 percent PHOS-CHEK ® P/30 fire retardant.

TABLE I

| | SAMPLES | | | | | | | | | | |
|---|---|---|---|---|---|---|---|---|---|---|---|
| | GROUP A | | | | | | GROUP B | | | | |
| INGREDIENTS (grams) | 1 | 2 | 3 | 4 | 5 | 6 | 7 | 8 | 9 | 10 | 11 |
| Composition of Example I | 370.8 | 393.2 | 393.2 | 393.2 | 393.2 | 393.2 | 386.4 | 386.4 | 386.4 | 386.4 | 386.4 |
| Water | 6.4 | — | 3.4 | 0.2 | 3.5 | 3.5 | 13.6 | 3.7 | 7.0 | 0.4 | 3.7 |
| DEQUEST ® 2052 phosphonate[a] | — | 6.8 | 3.4 | — | — | — | — | — | — | — | — |
| DEQUEST ® 2042 phosphonate[b] | — | — | — | 6.6 | 3.3 | — | — | — | — | 13.2 | 9.9 |
| Ammonium Salt of EDTA (a 30% active solution)[c] | — | — | — | — | — | 3.3 | — | 9.9 | 6.6 | — | — |
| % Chelating Agent (based on ammonium polyphosphate present in the sample) | 0 | 2% | 1% | 2% | 1% | 1% | 0 | 3% | 2% | 4% | 3% |

[a] A 29 percent active solution of hexammonium salt of hexamethylene-diaminetetra(methylenephosphonic acid) sold by Monsanto Company.
[b] A 30 percent active solution of hexammonium salt of ethylenediaminetetra(methylenephosphonic acid) sold by Monsanto Company.
[c] Prepared by adding 30.3 grams of EDTA (99% active) to 50.0 grams of water and neutralizing with 19.7 grams of aqueous ammonium hydroxide (29% assay). The resulting solution pH was 7.4

Each of the samples was mixed well after the addition of the chelating agent and/or water. The samples were stored in a container at 49° C. (to accelerate viscosity increase with time) for four weeks with viscosity and water soluble phosphorus measured at certain intervals. A desired result is a lowering of the viscosity increase with time. A lowering of the increase in water soluble phosphorous is considered an additional improvement since it is believed that this results in an improvement in coating properties, e.g., washability and water-resistance. Samples 1 and 7 (no chelating agent) are controls for comparison of the results listed below. The viscosity was measured using a Stormer viscosimeter and phos-

| Ingredients (Grams) | SAMPLES | | | | | |
|---|---|---|---|---|---|---|
| | 12 | 13 | 14 | 15 | 16 | 17 |
| Paint | 400 | 400 | 400 | 400 | 400 | 400 |
| Water | — | — | — | 9.5 | 6.35 | — |
| Ammonium salt of EDTA (a 30% active solution)[a] | 6.35 | 9.5 | — | — | — | — |
| DEQUEST ® 2042 Phosphonate | — | — | 9.5 | — | — | — |
| % Chelating Agent (based on PHOS-CHEK P/30 present in the -continued

| Ingredients | SAMPLES | | | | | |
|---|---|---|---|---|---|---|
| (Grams) | 12 | 13 | 14 | 15 | 16 | 17 |
| sample) | 2% | 3% | 3% | 0 | 0 | 0 |

<sup>a</sup>Prepared as described in Table I.

Samples 12–17 were stored at 49° C. for 3 weeks and the following table contains results of viscosity and water soluble phosphorous measurements taken during that time. The testing was done by procedures described in Example II.

| | SAMPLE | | | | | |
|---|---|---|---|---|---|---|
| | 12 | 13 | 14 | 15 | 16 | 17 |
| Viscosity, Krebs Units | | | | | | |
| Initial | 89 | 87 | 93 | 82 | 86 | 93 |
| 1 Week | 91 | 89 | 93.5 | 88.5 | 92.5 | 98 |
| 3 Weeks | 95.5 | 92.5 | 99 | 94 | 97 | 105 |
| % Increase In 3 Weeks | 7% | 6% | 6% | 15% | 13% | 13% |
| Water Soluble Phosphorus % | | | | | | |
| Initial | 1.60 | 1.61 | 1.95 | 1.75 | 1.75 | 1.79 |
| 1 Week | 1.86 | 1.79 | 2.33 | 2.42 | 2.48 | 2.47 |
| 3 Weeks | 2.16 | 2.01 | 2.91 | 3.07 | 3.20 | 3.25 |
| % Increase In 3 Weeks | 35% | 25% | 49% | 75% | 89% | 82% |

The data in the above Examples II and III clearly demonstrate the improvements which result from addition of various chelating agents to phosphorus-containing intumescent paint compositions according to the present invention.

What is claimed is:

1. In an aqueous fire retardant coating composition which comprises:
   (A) a carbonific;
   (B) a film-forming binder; and
   (C) a substantially water-insoluble phosphorus-containing material having at least one P—O—P linkage selected from the group consisting of ammonium polyphosphates, substituted ammonium polyphosphates, amide polyphosphate condensates, melamine pyrophosphates and mixtures thereof; wherein (A), (B) and (C) constitute from about 20 to about 90 percent by weight of the total composition, the improvement wherein said composition is further composed of a chelating agent selected from the group consisting of aminocarboxylic acids, aminophosphonic acids, alkylene and alkylidene diphosphonic acids, α-hydroxy carboxylic acids, ethanolamines and substituted ethanolamines, carboxylic ethers, polymeric polycarboxylic acids and salts of said acids; said chelating agent composing from about 0.1 percent to about 10 percent by weight of the total composition.

2. A method of stabilizing the viscosity of an aqueous intumescent fire retardant coating composition which contains:
   (A) a carbonific;
   (B) a film-forming binder; and
   (C) a substantially water-insoluble phosphorus-containing material having at least one P—O—P linkage selected from the group consisting of ammonium polyphosphates, substituted ammonium polyphosphates, amide polyphosphate condensates, melamine pyrophosphates and mixtures thereof; wherein (A), (B) and (C) constitute from about 20 to about 90 percent by weight of the total composition, the improvement wherein said composition is further composed of a chelating agent selected from the group consisting of aminocarboxylic acids, aminophosphonic acids, alkylene and alkylidene diphosphonic acids, α-hydroxy carboxylic acids, ethanolamines and substituted ethanolamines, carboxylic ethers, polymeric polycarboxylic acids and salts of said acids; said chelating agent composing from about 0.1 percent to about 10 percent by weight of the total composition.

3. A composition in accordance with claim 1 wherein component (C) is selected from the group consisting of ammonium polyphosphates, substituted ammonium polyphosphates and mixtures thereof.

4. A composition in accordance with claim 3 wherein component (C) is an ammonium polyphosphate.

5. A composition in accordance with claim 4 wherein the chelating agent is ethylenediaminetetra(methylenephosphonic acid) or an ammonium or alkali metal salt thereof.

6. A method in accordance with claim 2 wherein the chelating agent is ethylenediaminetetraacetic acid or an ammonium or alkali metal salt thereof.

7. A method in accordance with claim 2 wherein the chelating agent is ethylenediaminetetra(methylenephosphonic acid) or an ammonium or alkali metal salt thereof.

* * * * *